United States Patent [19]
Clarke

[11] 3,757,985
[45] Sept. 11, 1973

[54] HARVESTING CONTAINER PARTICULARLY FOR USE IN PICKING FRUIT

[76] Inventor: Philip Clarke, The Priory, Eddington, Herne Bay, Kent, England

[22] Filed: Oct. 8, 1971

[21] Appl. No.: 187,714

[30] Foreign Application Priority Data
Oct. 21, 1970 Great Britain.................. 49,878/70
Sept. 3, 1971 Great Britain.................. 49,878/71

[52] U.S. Cl.................... 220/29, 220/63 R, 294/71
[51] Int. Cl............................................ B65d 51/18
[58] Field of Search..................... 220/29, 65, 17.1, 220/85 K, 63 R; 294/71

[56] References Cited
UNITED STATES PATENTS

| | | | |
|---|---|---|---|
| 2,063,650 | 12/1936 | Woodruff............................. | 294/71 |
| 3,282,462 | 11/1966 | Box...................................... | 220/29 |
| 3,464,733 | 9/1969 | Shaw.................................... | 294/71 |
| 2,035,838 | 3/1936 | Reeder et al. ....................... | 294/71 |
| 3,432,069 | 3/1969 | Craig................................... | 220/63 R |
| 1,754,620 | 4/1930 | Forrestel.............................. | 294/71 |
| 2,036,170 | 3/1936 | Fildes................................... | 294/71 |
| 1,809,640 | 6/1931 | Showers............................... | 294/71 |
| 1,320,350 | 10/1919 | Summers ............................. | 294/71 |

FOREIGN PATENTS OR APPLICATIONS
1,007,330 12/1962 Great Britain........................ 294/71

Primary Examiner—George E. Lowrance
Assistant Examiner—Alan Eskenas
Attorney—Allison C. Collard

[57] ABSTRACT

Harvesting container, particularly for use in picking fruit, which has a two-part outwardly opening hinged bottom. The inside and underside of each bottom part is covered with resilient material. The bottom is supported and held closed by a flexible carrying handle when the container is suspended by the handle.

3 Claims, 3 Drawing Figures

Patented Sept. 11, 1973

3,757,985

HARVESTING CONTAINER PARTICULARLY FOR USE IN PICKING FRUIT

The invention relates to harvesting containers particularly for use in fruit picking such as for apples, peaches or grapes, but also applicable for use in gathering potatoes, tomatoes, eggs or other fragile produce. The main purpose of the invention is to provide a readily portable container for collecting produce which can be easily emptied into a bulk storage bin or the like without unduly damaging the produce.

According to the invention there is provided a harvesting container having a two-part outwardly opening hinged bottom which is supported and held closed by a flexible carrying handle when the container is suspended by the handle.

Said carrying handle may comprise a rigid upper member, from which the container is intended to be suspended, with flexible members extending from the ends thereof to the central portions of the unhinged ends of the two-part bottom. Said flexible members may each comprise a pair of cables extending from each end of the rigid upper member, through respective guide members formed in end walls of the container, to the two-part bottom, each cable of each pair being connected one to one half and the other to the other half of the two-part bottom at each end thereof. The rigid upper member may be formed with or carry a hook and/or a loop for suspension of the container therefrom.

The container may have a generally rectangular transverse cross-section, the two-part bottom being hinged from the bottom edges of the longer sides of the container and the central portions of the upper edges of the shorter ends being formed with V-shaped cut-outs through which the flexible carrying handle passes. One of the longer sides of the container may be formed with an arcuate inward depression over its complete depth such that the container has a generally kidney-shaped transverse cross-section. Downwardly facing, hook shaped guides may be formed in or carried by the upper edges of the ends of the container, adjacent the edge of the V-shaped notch which is nearer the side of the container formed with the arcuate depression. A further handle may be formed in or carried by the upper edge of each longer side of the container for use when emptying the container.

The inside of each bottom part may be covered with resilient material. The underside of each bottom part and a surrounding rim of the container may also be covered with a resilient material. The resilient material may be sponge rubber or foam plastics.

The container may be moulded of glass fibre synthetic plastics material or light metal alloy.

The foregoing and further features of the invention may be more readily understood from the following description of a preferred embodiment thereof, by way of example, with reference to the accompanying drawing, in which.

Figure 1:
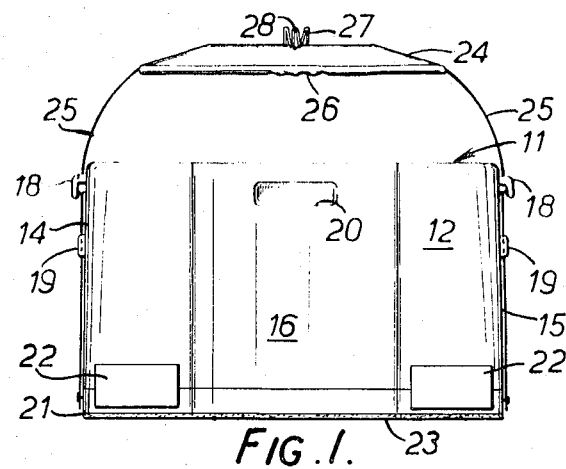
FIG. 1 is a side elevational view of a harvesting container with a hinged two-part bottom in its carrying condition.
Figure 2:
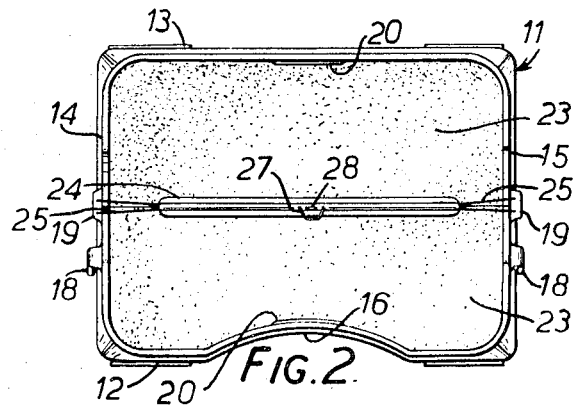
FIG. 2 is a plan view of the container of FIG. 1.
Figure 3:
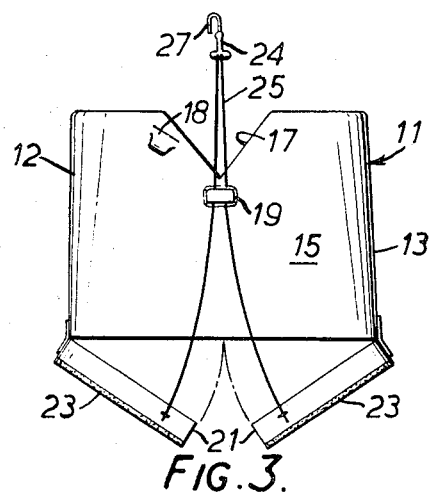
FIG. 3 is an end elevational view of the container of FIGS. 1 and 2 in its emptying condition with the two-part bottom opening.

Referring now to the drawing there is shown a harvesting container which comprises a moulded body 11 of glass fibre, synthetic plastics material or light metal alloy. The body 11 is of generally rectangular transverse cross-section having longer sides 12 and 13 and shorter ends 14 and 15. The sides 12 and 13, and ends 14 and 15 slope outwardly from the top to bottom so that the bottom opening is larger than that at the top. The side 12 is formed with a arcuate inwardly directed depression 16 for reasons described hereinafter. The central portions of the upper edges of ends 14 and 15 are formed with U-shaped cut outs 17, (FIG. 3). On the edge of each cut-out 17 nearer to side 12 are formed downwardly directed hook-shaped guides 18. Apertured guides 19 are formed on ends 14 and 15 immediately below cut-outs 17. Handle depressions 20 are formed in the centres of upper edges of sides 12 and 13.

Two outwardly opening bottom members 21 are hinged one to each of the sides 12 and 13, by hinges 22. The inner and outer surfaces of bottom members 21 are covered with sponge rubber sheets 23.

A carrying handle for the container comprises a rigid upper member 24 which has a pair of cables 25, of stranded steel wire, nylon or the like, moulded integrally in it so as to depend from each end thereof. The cables 25 pass through cut-outs 17, through the apertures in guides 19 and are fixed to the ends of bottom members 21 adjacent their centre edges. The member 24 is formed with finger depressions 26 to facilitate carrying by hand. In addition a metal hook 27 and a metal loop 28 are moulded into the member 24.

In use, for example, when picking fruit from a tree, the container is lifted by the member 24 and cables 25 maintain the bottom members 21 closed. The container can be suspended from a branch of the tree by inserting a hook (not shown) through the loop 28 and locating the hook (not shown) over a branch. Alternatively the hook 27 can be located over a portion of a harness worn by the person picking the fruit. In this mode of use the container is located against the body of the user with the shaped side 12 adjacent the body and the cables 25 above guides 19 located under the hook-shaped guides 18. This locates the container safely and snugly against the body of the user.

When the container is full it is carried to a bulk storage bin and placed on the bottom of it or on fruit previously deposited in it. The sponge rubber 23 on the outside of members 21 prevents any such fruit being damaged. The carrying handle is then released and the container is held and lifted by handles 20 formed in sides 12 and 13. Raising the container in this manner allows the bottom members 21 to open (as shown partially in FIG. 3) due to the weight of the fruit in the container and the fruit is deposited on top of the fruit in the bulk storage bin without damage to the fruit. The downwardly, outwardly sloping sides and ends enable the fruit to pass freely out of the open bottom of the container.

Various modifications could be made to the container, for example, handles 20 could be replaced by handles attached to the top edges of sides 12 and 13 and loop 28 could be replaced by an aperture formed through member 24. Instead of cables 25 being embedded into the moulding of handle 24 they could be threaded through a pair of holes formed at each end of handle 24.

I claim:

1. A harvesting container having a two-part outwardly opening hinged bottom which is supported and held closed by a flexible carrying handle when the container is suspended by the handle, the container having a generally rectangular transverse cross section, said two-part bottom being hinged from the bottom edges of the longer sides of the container and the central portions of the upper edges of the shorter ends being formed with V-shaped cut-outs through which the flexible carrying handle passes, one of the longer sides of the container being formed with an arcuate inward depression over its complete depth such that the container has a generally kidney-shaped transverse cross section.

2. The harvesting container as recited in claim 1, wherein downwardly facing, hook-shaped guides are formed in or carried by the upper edges of the ends of the container, adjacent the edge of the V-shaped notch which is nearer the side of the container formed with the arcuate depression.

3. A harvesting container having a two-part outwardly opening hinged bottom which is supported and held closed by a flexible carrying handle when the container is suspended by the handle, the inside and underside of each bottom part being covered with resilient material.

* * * * *